United States Patent
Yamamoto et al.

(10) Patent No.: US 9,009,513 B2
(45) Date of Patent: Apr. 14, 2015

(54) MULTIPROCESSOR FOR PROVIDING TIMERS ASSOCIATED WITH EACH OF PROCESSOR CORES TO DETERMINE THE NECESSITY TO CHANGE OPERATING FREQUENCY AND VOLTAGE FOR PER CORE UPON THE EXPIRATION OF CORRESPONDING TIMER

(75) Inventors: Hitoshi Yamamoto, Tokyo (JP); Akio Idehara, Tokyo (JP); Yasuhiro Tawara, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 365 days.

(21) Appl. No.: 13/362,734

(22) Filed: Jan. 31, 2012

(65) Prior Publication Data

US 2012/0198257 A1    Aug. 2, 2012

(30) Foreign Application Priority Data

Jan. 31, 2011   (JP) ................................ 2011-017695

(51) Int. Cl.
*G06F 1/00*   (2006.01)
*G06F 1/32*   (2006.01)

(52) U.S. Cl.
CPC .............. *G06F 1/324* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 6,226,717 B1 * | 5/2001 | Reuter et al. .................. | 711/147 |
| 6,928,566 B2 | 8/2005 | Nunomura | |
| 7,437,581 B2 | 10/2008 | Grochowski et al. | |
| 7,596,708 B1 * | 9/2009 | Halepete et al. .............. | 713/322 |
| 2003/0188207 A1 * | 10/2003 | Schelling ....................... | 713/310 |
| 2006/0190713 A1 * | 8/2006 | Schelling ......................... | 713/1 |
| 2007/0070820 A1 * | 3/2007 | Gallant ........................ | 368/108 |
| 2008/0104436 A1 * | 5/2008 | Sawyers et al. .............. | 713/323 |
| 2010/0185878 A1 * | 7/2010 | Rozen et al. .................. | 713/300 |
| 2012/0159242 A1 * | 6/2012 | Richardson et al. ........... | 714/15 |

FOREIGN PATENT DOCUMENTS

| | | |
|---|---|---|
| JP | 2002-215599 A | 8/2002 |
| JP | 2008-513912 A | 5/2008 |
| JP | 2010-140319 A | 6/2010 |

OTHER PUBLICATIONS

Naoto Sugai, et al., "A hybrid OS environment on Single-Chip Multi-Processor-Implementation of interfac between OSs-", Information Processing Society of Japan, 66th National Meeting, Mar. 2004, National Convention 2D-6.

* cited by examiner

*Primary Examiner* — Thomas Lee
*Assistant Examiner* — Zhipeng Wang
(74) *Attorney, Agent, or Firm* — Sughrue Mion, PLLC

(57) ABSTRACT

Timers #0 through #3 are each supplied with a period for prohibiting a change in a power supply voltage. An OS #A or an OS #B determines necessity to change an operating frequency for a CPU core corresponding to any of the timers #0 through #3 when the timer exceeds the prohibition period. It is determined whether it is necessary to change a power supply voltage supplied to CPU cores #0 through #3 when the OS #A or the OS #B determines necessity to change an operating frequency. When it is determined that a power supply voltage needs to be changed, a power supply voltage change portion 20 changes the power supply voltage supplied to the CPU cores #0 through #3. Therefore, it is possible to improve the processing efficiency without needing to acquire inter-OS lock.

14 Claims, 6 Drawing Sheets

FIG. 2

| MAXIMUM OPERATING FREQUENCY | POWER SUPPLY VOLTAGE |
|---|---|
| 600 MHz | 1.4 V |
| 300 MHz | 1.2 V |
| 150 MHz | 1.0 V |

MULTIPROCESSOR FOR PROVIDING TIMERS ASSOCIATED WITH EACH OF PROCESSOR CORES TO DETERMINE THE NECESSITY TO CHANGE OPERATING FREQUENCY AND VOLTAGE FOR PER CORE UPON THE EXPIRATION OF CORRESPONDING TIMER

CROSS-REFERENCE TO RELATED APPLICATIONS

The disclosure of Japanese Patent Application No. 2011-17695 filed on Jan. 31, 2011 including the specification, drawings and abstract is incorporated herein by reference in its entirety.

BACKGROUND

The present invention relates to a technology of exclusively controlling a shared resource under plural OS's (Operating Systems) running on a multi-core processor (multiprocessor). More particularly, the invention relates to a multiprocessor that exclusively controls a shared resource without using inter-OS lock.

Recently, there is an increasing demand to improve the processor performance in various fields such as multimedia processing and high-definition image processing. However, present LSI (Large Scale Integrated circuit) technologies have limitations in device acceleration. As a solution, parallel processing is receiving increasing attention. Multiprocessor systems are aggressively researched and developed.

Generally, the inter-OS lock provides exclusive control over access to a resource shared by the OS's that are running on a multi-core processor (multiprocessor). The related technologies include the inventions disclosed in patent documents 1 through 3 and the technology disclosed in non-patent document 1 as shown below.

Patent document 1 aims to provide a processor system integrating plural CPUs with a semiconductor device capable of less overhead and improved power saving. The multi-core processor includes the clock stop feature, the clock restart feature, and the interrupt control circuit. The clock stop feature enables a package to perform one or more OS's and application programs and, while they are performed, changes one or more CPUs to an energy saving state that consumes less power than CPU operations. The clock restart feature is available within a chip and releases the energy saving state enabled by the clock stop feature for one or more CPUs. The interrupt control circuit is available between chips in the package and releases the energy saving state enabled by the clock stop feature for one or more CPUs.

Patent document 2 aims to provide a multiprocessor system capable of greatly reducing power consumption. Processor A controls a clock frequency control portion to change the frequency of a clock input to processor A in accordance with a ratio between estimated process time Ta for program A and estimated process time Tb for program B. Processor A also controls a variable power supply to change a power supply voltage supplied to processor A in accordance with the frequency of a clock input to processor A. Accordingly, it is possible to greatly decrease power consumption for processor A.

Patent document 3 discloses the method and the apparatus for changing multi-core processor configurations. According to one embodiment, the throttle module (or throttle logic) can find the quantity of parallelism in a currently executed program and change thread execution of the program in various cores. If the quantity of parallelism is large, the processor can be configured to execute a large amount of thread in a core configured to consume less power. If the quantity of parallelism is small, the processor can be configured to execute a small amount of thread in a core configured to provide better scalar performance.

Non-patent document 1 discloses the exclusive control of access to shared memory as a resource shared among OS's using a synchronous instruction of the processor.

Patent Document 1: Japanese Unexamined Patent Publication No. 2010-140319
Patent Document 2: Japanese Unexamined Patent Publication No. 2002-215599
Patent Document 3: Japanese Translation of Unexamined PCT Application No. 2008-513912
Non-Patent Document 1: Sugai, Endou, Yamaguchi, and Kondou. Implementation of hybrid OS environment on a single-chip multiprocessor—Implementation of an inter-OS interface—Information Processing Society of Japan, National convention 2D-6, March 2004.

SUMMARY

According to the related art, the exclusive control method for inter-OS resources uses the inter-OS lock and increases the lock acquisition time as the number of OS's increases. There has been a problem of decreasing the processing efficiency of the overall system.

Accesses from plural processors concentrate on a memory area used for the inter-OS lock. There has been another problem of decreasing the bus performance.

The present invention has been made in consideration of the foregoing. It is therefore an object of the invention to provide a multiprocessor capable of improving the processing efficiency without needing to acquire inter-OS lock.

According to an aspect of the present invention, there is provided a multiprocessor that provides exclusive control over a shared resource between plural operating systems' running on plural processor cores capable of operating at different operating frequencies. The multiprocessor includes: plural timers that are provided to each of the processor cores and are each supplied with a period for prohibiting a change in a power supply voltage; a first determination means for determining necessity to change an operating frequency for a processor core corresponding to any of the timers when the timer exceeds the prohibition period; a second determination means for determining necessity to change a power supply voltage supplied to the processor cores when the first determination means determines necessity to change an operating frequency; an operating frequency change means for changing a frequency of a clock supplied to the processor core when the first determination means determines necessity to change an operating frequency; and a power supply voltage change means for changing a power supply voltage supplied to the processor cores when the second determination means determines necessity to change a power supply voltage.

Preferably, the timers are set with different counter values and then start decrement, and all the timers stop decrement when any one of the counter values in the timers reaches 0.

Preferably, the power supply voltage change means supplies the processor cores with a power supply voltage corresponding to a clock having a highest operating frequency out of clocks to be supplied to the processor cores.

When the first determination means determines to increase an operating frequency of the processor core, the power supply voltage change means preferably increases a power supply voltage. Thereafter, the operating frequency change means increases an operating frequency.

When the first determination means determines to decrease an operating frequency of the processor core, the operating frequency change means preferably decreases an operating frequency regardless of counter values of the timers.

According to another aspect of the present invention, there is provided a multiprocessor that provides exclusive control over a shared resource between plural operating systems running on plural processor cores capable of operating at different operating frequencies. The multiprocessor includes: plural timers that are provided to each of the operating systems and are each supplied with a period for prohibiting a change in a power supply voltage; a first determination means for determining necessity to change an operating frequency for a processor core used to run an operating system corresponding to any of the timers when the timer exceeds the prohibition period; a second determination means for determining necessity to change a power supply voltage supplied to the processor cores when the first determination means determines necessity to change an operating frequency; an operating frequency change means for changing a frequency of a clock supplied to the processor core when the first determination means determines necessity to change an operating frequency; and a power supply voltage change means for changing a power supply voltage supplied to the processor cores when the second determination means determines necessity to change a power supply voltage.

The first determination means determines necessity to change an operating frequency for a processor core corresponding to any of the timers when the timer exceeds the prohibition period. The second determination means determines necessity to change a power supply voltage supplied to the processor cores when the first determination means determines necessity to change an operating frequency. It is possible to exclusively control the operating frequency and the power supply voltage and therefore improve the processing efficiency without needing to acquire inter-OS lock.

The timers are set with different counter values and then start decrement. As only one timer's counter value reaches "0", it is possible to exclusively determine necessity to change the operating frequency for a processor core corresponding to the timer and change the power supply voltage.

The power supply voltage change means supplies the processor cores with a power supply voltage corresponding to a clock having a highest operating frequency out of clocks to be supplied to the processor cores. An optimal power supply voltage can be supplied.

When the first determination means determines to increase an operating frequency of the processor core, the power supply voltage change means increases a power supply voltage. Thereafter, the operating frequency change means increases an operating frequency. It is possible to prevent the processor core from malfunctioning.

When the first determination means determines to decrease an operating frequency of the processor core, the operating frequency change means decreases an operating frequency regardless of counter values of the timers. The power consumption can be reduced.

BRIEF DESCRIPTION OF THE DRAWINGS

FIG. 2 exemplifies a frequency-voltage correspondence table;

DETAILED DESCRIPTION

First Embodiment

Figure 1:
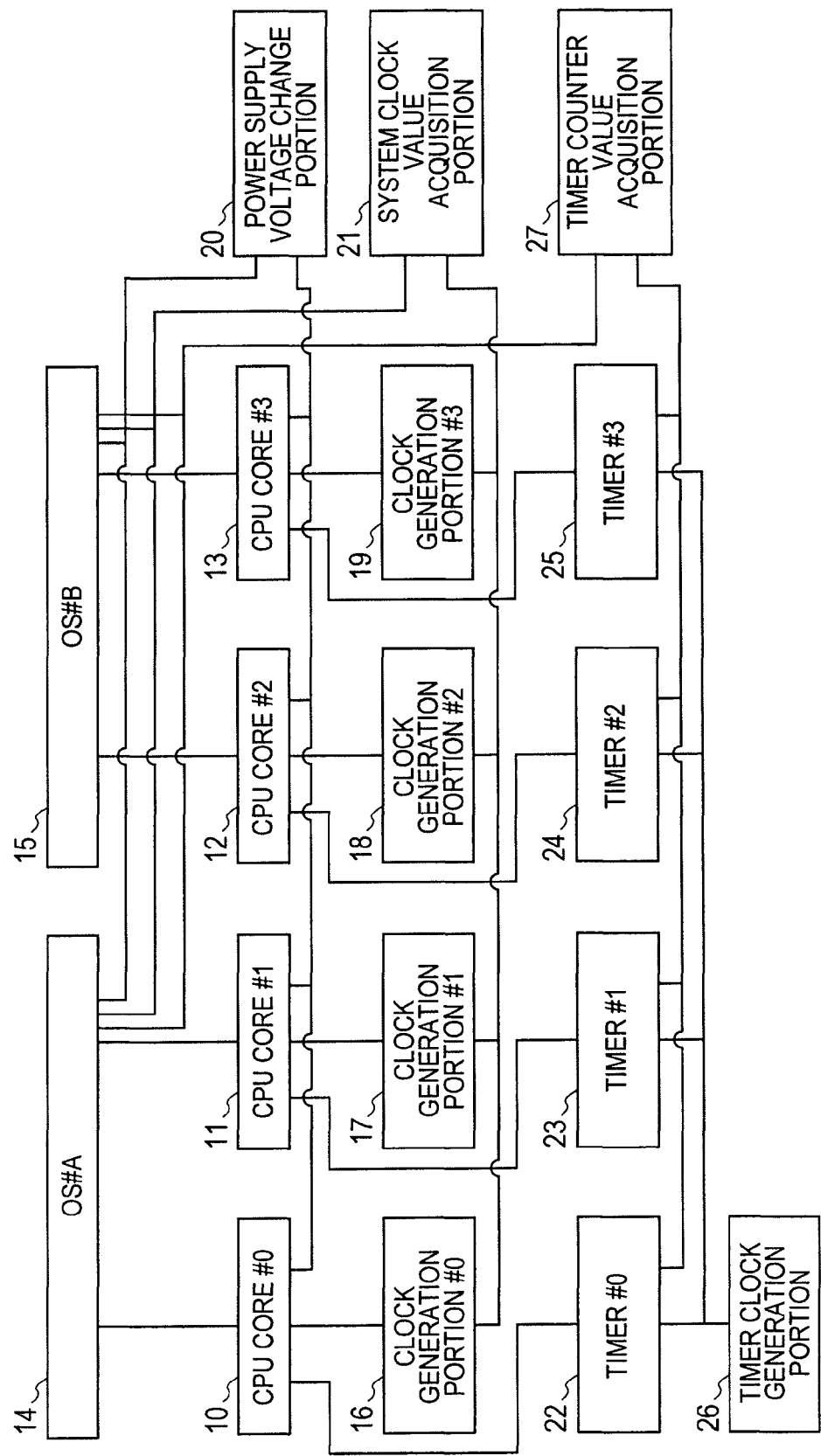
FIG. 1 is a block diagram showing an example configuration of a multiprocessor according to a first embodiment of the invention.

FIG. 1 is a block diagram showing an example configuration of a multiprocessor according to the first embodiment of the invention. The multiprocessor includes: CPU (Central Processing Unit) cores #0 through #3 (10 through 13); OS #A (14) running on the CPU cores #0 and #1 (10 and 11); OS #B (15) running on the CPU cores #2 and #3 (12 and 13); clock generation portion #0 through #3 (16 through 19) provided correspondingly to the CPU cores #0 through #3 (10 through 13); a power supply voltage change portion 20; a system clock value acquisition portion 21; timers #0 through #3 (22 through 25) provided correspondingly to the CPU cores #0 through #3 (10 through 13); a timer clock generation portion 26; and a timer counter value acquisition portion 27.

The CPU cores #0 through #3 (10 through 13) operate on clocks output from the clock generation portions #0 through #3 (16 through 19), respectively. The CPU cores #0 through #3 (10 through 13) operate on a power supply voltage output from the power supply voltage change portion 20.

The clock generation portions #0 through #3 (16 through 19) can change clock frequencies in accordance with instructions from the CPU cores #0 through #3 (10 through 13) or instructions from the OS #A (14) and the OS #B (15). Therefore, the CPU cores #0 through #3 (10 through 13) can operate on different clock frequencies.

The power supply voltage change portion 20 changes a power supply voltage supplied to the CPU cores #0 through #3 (10 through 13) in accordance with instructions from the OS #A (14) or the OS #B (15). The CPU cores #0 through #3 (10 through 13) are each supplied with the same power supply voltage.

The system clock value acquisition portion 21 acquires the frequency (system clock value) of a clock output from the clock generation portions #0 through #3 (16 through 19) in accordance with an instruction from the OS #A (14) or the OS #B (15) and outputs the frequency to, the OS #A (14) or the OS #B (15).

The timers #0 through #3 (22 through 25) are provided correspondingly to the CPU cores #0 through #3 (10 through 13), respectively. The timers #0 through #3 (22 through 25) are each provided with a period to inhibit an operation of changing the power supply voltage and decrement a counter value in synchronization with a timer clock output from the timer clock generation portion 26. The timer whose counter value reaches "0" outputs an interrupt request to the corresponding CPU core.

The period to inhibit an operation of changing the power supply voltage is assumed to be a cycle to determine whether to change the clock frequency of the corresponding CPU core, for example. The timers #0 through #3 (22 through 25) are set with any counter values. The important thing is that the timers #0 through #3 (22 through 25) are set with different counter values and that only one timer's counter value always reaches "0."

The timer clock generation portion 26 generates timer clocks to be supplied to the timers #0 through #3 (22 through 25). The timers #0 through #3 (22 through 25) are supplied with the same timer clock.

The timer counter value acquisition portion 27 acquires counter values for the timers #0 through #3 (22 through 25) and stops decrementing all the timers #0 through #3 (22 through 25) if any one of the counter values in the timers reaches "0." The timer counter value acquisition portion 27 acquires counter values for the timers #0 through #3 (22 through 25) in accordance with an instruction from the OS #A (14) or the OS #B (15) and outputs the counter values to the OS #A (14) or the OS #B (15).

FIG. 2 exemplifies a frequency-voltage correspondence table. The frequency-voltage correspondence table shows the correspondence between a maximum operating frequency for the CPU cores #0 through #3 (10 through 13) and a power supply voltage supplied to the CPU cores #0 through #3 (10 through 13).

If the maximum operating frequency is set to 150 MHz, the power supply voltage of 1.0 V is supplied to the CPU cores #0 through #3 (10 through 13). If the maximum operating frequency is set to 300 MHz, the power supply voltage of 1.2 V is supplied to the CPU cores #0 through #3 (10 through 13). If the maximum operating frequency is set to 600 MHz, the power supply voltage of 1.4 V is supplied to the CPU cores #0 through #3 (10 through 13).

The frequency-voltage correspondence table may be provided in the OS #A (14) and the OS #B (15), the power supply voltage change portion 20, or the system clock value acquisition portion 21.

Figure 3:
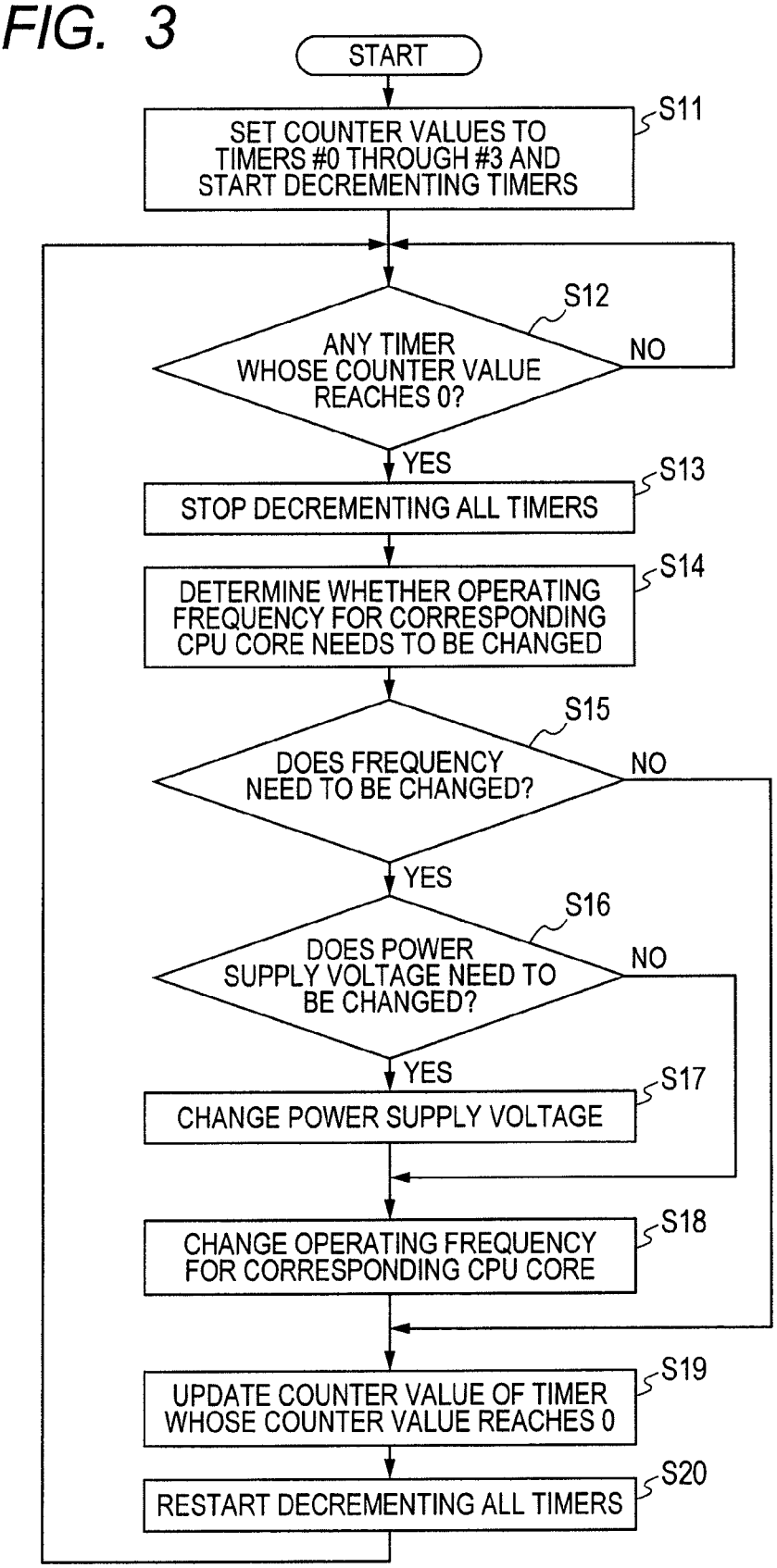
FIG. 3 is a flowchart showing operations of the multiprocessor according to the first embodiment of the invention.

FIG. 3 is a flowchart showing operations of the multiprocessor according to the first embodiment of the invention. The timers #0 through #3 (22 through 25) are set with counter values and start decrementing (S11). For example, the CPU cores #0 through #3 (10 through 13) set counter values to the timers #0 through #3 (22 through 25) and start decrementing the counter values at the same timing.

The OS #A (14) and the OS #B (15) may set counter values to the timers #0 through #3 (22 through 25). As mentioned above, the timers #0 through #3 (22 through 25) are set with different counter values. The decrement starts so that only one timer's counter value always reaches "0."

The timer counter value acquisition portion 27 acquires counter values for the timers #0 through #3 (22 through 25) and determines whether any timer's counter values reaches "0" (S12). If no timer contains the counter value reached "0" (No at S12), the process at step S12 is repeated.

If any one of the timers contains the counter value reached "0" (Yes at S12), the timer counter value acquisition portion 27 stops decrementing all the timers #0 through #3 (22 through 25) (S13). The timer containing the counter value reached "0" outputs an interrupt request to the corresponding CPU core.

Any of the CPU cores #0 through #3 (10 through 13) receives the interrupt request. Then, the OS #A (14) or the OS #B (15) running on the CPU core accepts the interrupt request and determines whether the operating frequency needs to be changed for the corresponding CPU core (S14). For example, the OS #A (14) or the OS #B (15) manages processing loads on the CPU core. The OS #A (14) or the OS #B (15) determines to decrease the clock frequency if the processing load is small and the clock frequency is too high. The OS #A (14) or the OS #B (15) determines to increase the clock frequency if the processing load is large and the clock frequency is too low.

If the corresponding CPU core need not change the frequency (No at S15), the process proceeds to step S19. If the corresponding CPU core needs to change the frequency (Yes at S15), the OS #A (14) or the OS #B (15) determines whether the power supply voltage needs to be changed (S16).

The OS #A (14) or the OS #B (15) acquires clock frequencies of the CPU cores #0 through #3 (10 through 13) from the system clock value acquisition portion 21 and finds the maximum operating frequency after the clock frequency change. The OS #A (14) or the OS #B (15) references the frequency-voltage correspondence table in FIG. 2, extracts the power supply voltage corresponding to the maximum operating frequency, and compares the extracted power supply voltage with the current power supply voltage. If the power supply voltages differ from each other, the OS #A (14) or the OS #B (15) determines that the power supply voltage needs to be changed. If the power supply voltages are equal each other, the OS #A (14) or the OS #B (15) determines that the power supply voltage need not be changed.

If the power supply voltage need not be changed (No at step S16), the process proceeds to step S18. If the power supply voltage needs to be changed (Yes at step S16), the OS #A (14) or the OS #B (15) commands the power supply voltage change portion 20 to change the power supply voltage (S17). The process then proceeds to step S18.

At step S18, the OS #A (14) or the OS #B (15) changes the operating frequency of the corresponding CPU core. The process proceeds to step S19.

At step S19, the OS #A (14) or the OS #B (15) updates the counter value of the timer whose counter value reaches "0." The OS #A (14) or the OS #B (15) restarts decrementing all the timers #0 through #3 (22 through 25) (S20) and then returns to step S12 to repeat the subsequent process.

Figure 4:
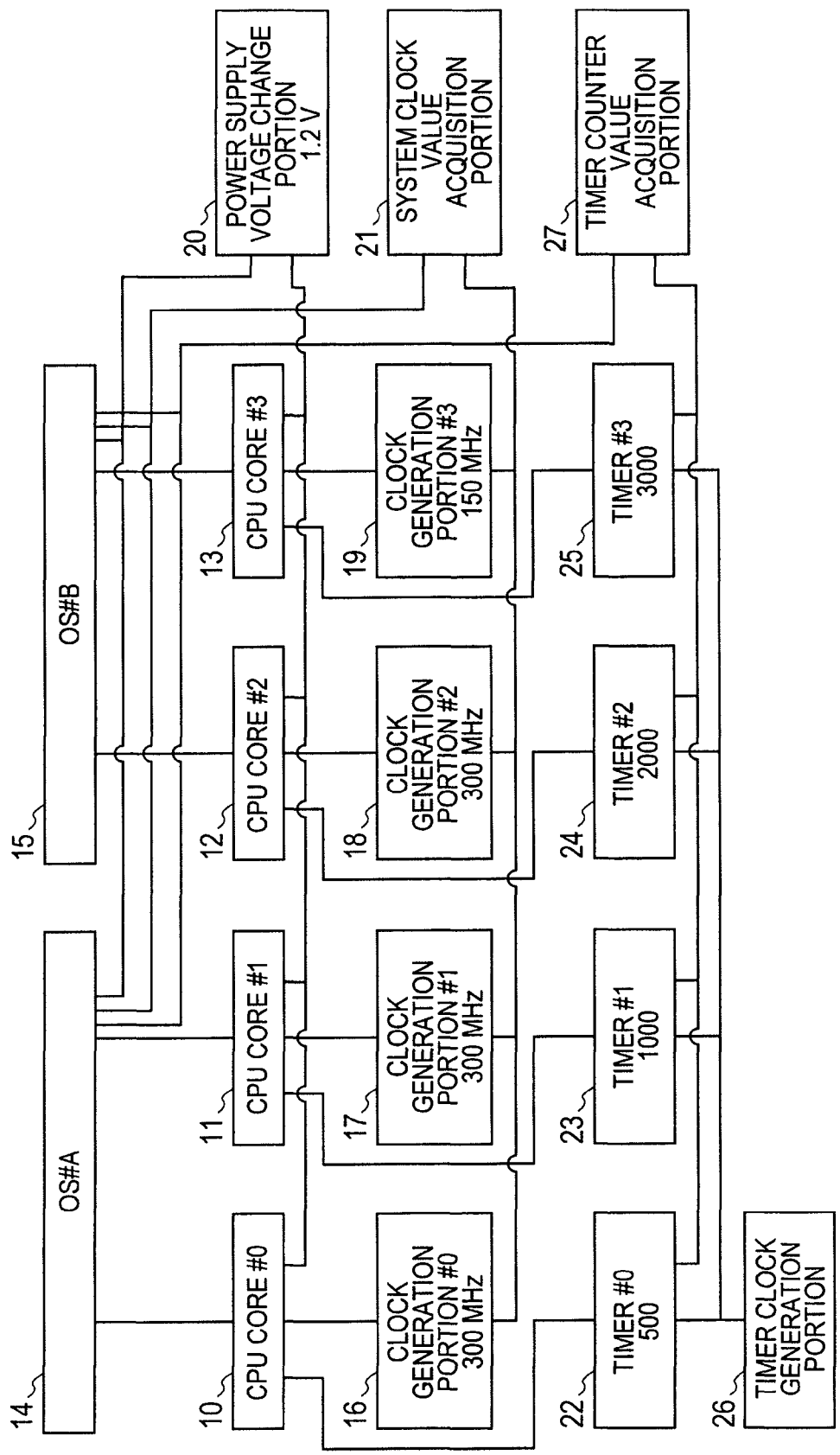
FIG. 4 shows an example of increasing a power supply voltage for the multiprocessor according to the first embodiment of the invention.

FIG. 4 shows an example of increasing a power supply voltage for the multiprocessor according to the first embodiment of the invention. As shown in FIG. 4, the clock generation portions #0 through #3 (16 through 19) are configured to output clocks of 300 MHz, 300 MHz, 300 MHz, and 150 MHz, respectively. The timers #0 through #3 (22 through 25) are set with counter values of 500, 1000, 2000, and 3000, respectively. The power supply voltage change portion 20 supplies a power supply voltage of 1.2 V to the CPU cores #0 through #3 (10 through 13).

While the timers #0 through #3 (22 through 25) are decremented, the counter value of the timer #0 (22) first reaches "0." The timer counter value acquisition portion 27 stops decrementing all the timers #0 through #3 (22 through 25). The timer #0 (22) then outputs an interrupt request to the CPU core #0 (10).

The OS #A (14) running on the CPU core #0 (10) accepts the interrupt request and then determines whether the operating frequency for the CPU core #0 (10) needs to be changed. The OS #A (14) might determine that the operating frequency for the CPU core #0 (10) needs to be changed from 300 MHz to 600 MHz. In this case, the OS #A (14) acquires clock frequencies for all the CPU cores from the system clock value acquisition portion 21.

The OS #A (14) references the frequency-voltage correspondence table and determines whether the power supply voltage needs to be changed. The OS #A (14) determines that the power supply voltage needs to be changed from 1.2 V to 1.4 V because the operating frequency for the CPU core #0 (10) is changed to 600 MHz.

The OS #A (14) commands the power supply voltage change portion 20 to change the power supply voltage to 1.4 V and then commands the clock generation portion #0 (16) to change the clock frequency to 600 MHz because the clock generation portion #0 (16) supplies clocks to the CPU core #0 (10). The OS #A (14) commands the timer counter value acquisition portion 27 to update the counter value of the timer #0 (22) and restart decrementing the timers #0 through #3 (22 through 25).

Figure 5:
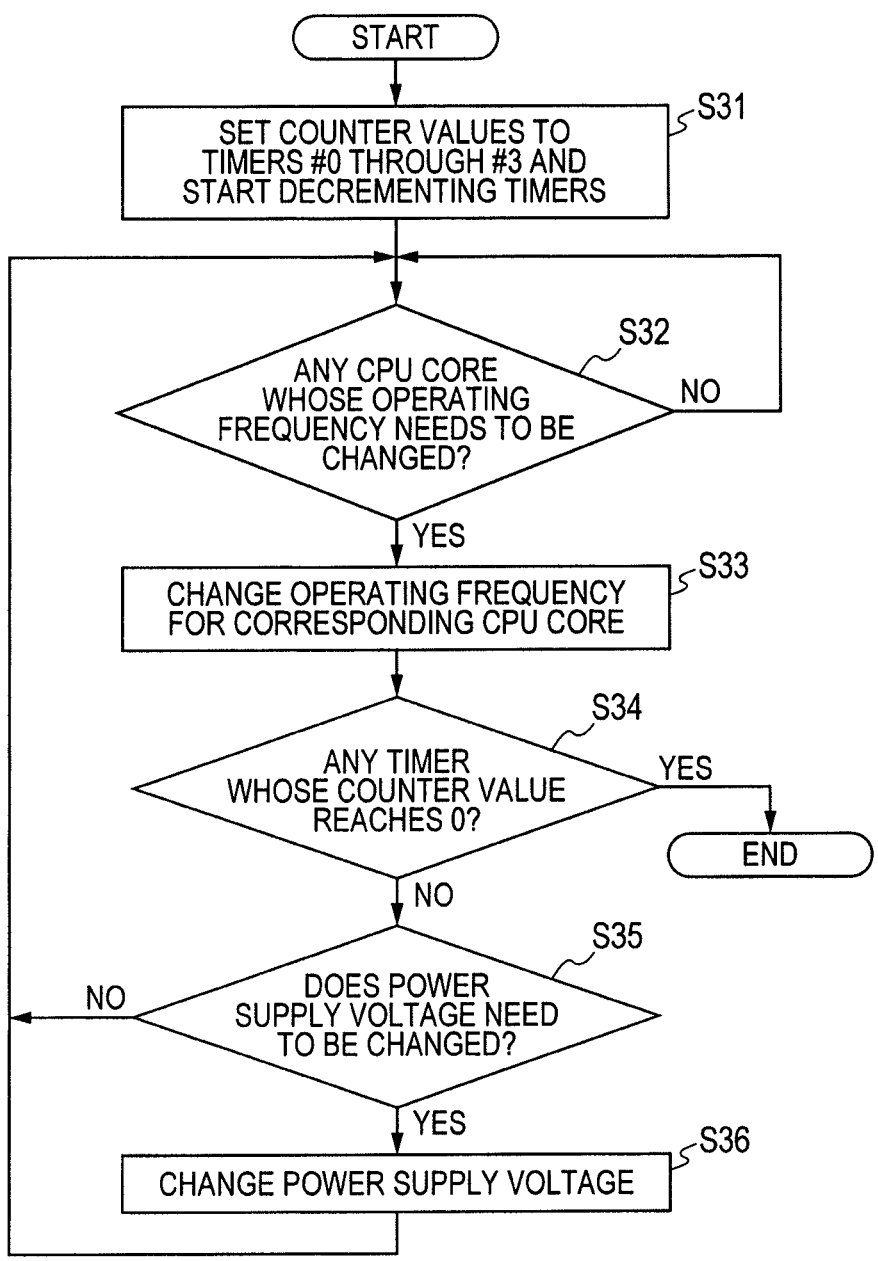
FIG. 5 shows operations during a decrease in a power supply voltage for the multiprocessor according to the first embodiment of the invention.

FIG. 5 shows operations during a decrease in a power supply voltage for the multiprocessor according to the first embodiment of the invention. The timers #0 through #3 (22 through 25) are set with counter values and start decrementing (S31).

The OS #A (14) and the OS #B (15) determine whether there is any CPU core requiring a change in the operating frequency (S32). If there is no CPU core requiring a change in the operating frequency (No at S32), the process at step S32 is repeated.

If there is any CPU core requiring a change in the operating frequency (Yes at S32), the OS #A (14) or the OS #B (15) changes the operating frequency of the corresponding CPU core regardless of counter values of the timers #0 through #3 (22 through 25) (S33).

The timer counter value acquisition portion 27 acquires counter values of the timers #0 through #3 (22 through 25) and determines whether there is a timer whose counter value reaches "0" (S34). If there is a timer whose counter value reaches "0" (Yes at S34), the timer counter value acquisition portion 27 stops decrementing all the timers #0 through #3 (22 through 25) and terminates the process.

If there is no timer whose counter value reaches "0" (No at S34), the OS #A (14) or the OS #B (15) determines whether the power supply voltage needs to be decreased (S35). If the power supply voltage need not be decreased (No at S35), control returns to step S32 and repeats the subsequent process. If the power supply voltage needs to be decreased (Yes at S35), the OS #A (14) or the OS #B (15) commands the power supply voltage change portion 20 to decrease the power supply voltage (S36). Control returns to step S32 and repeats the subsequent process.

Figure 6:
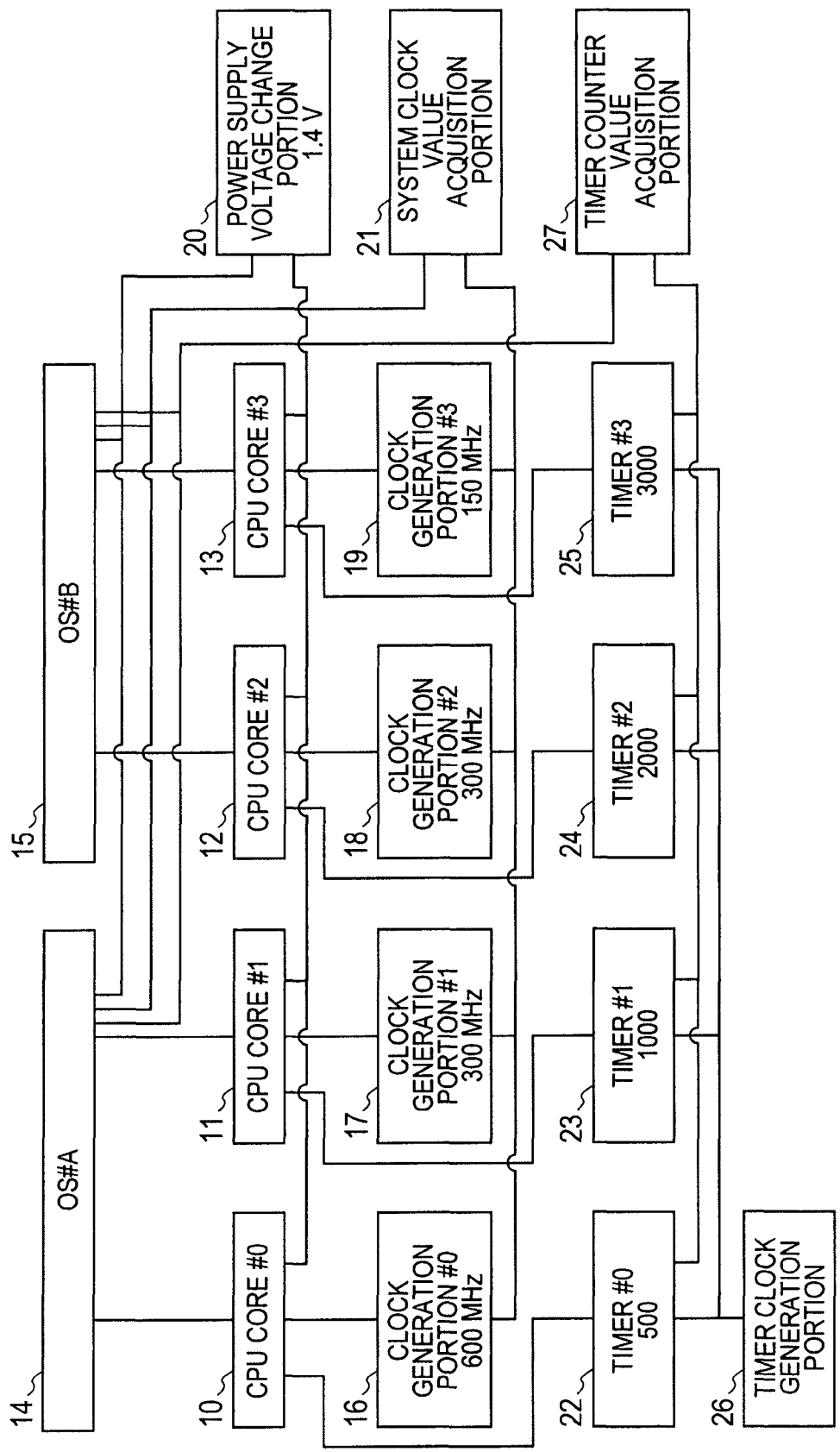
FIG. 6 shows an example of decreasing a power supply voltage for the multiprocessor according to the first embodiment of the invention.

FIG. 6 shows an example of decreasing a power supply voltage for the multiprocessor according to the first embodiment of the invention. As shown in FIG. 6, the clock generation portions #0 through #3 (16 through 19) are configured to output clocks of 600 MHz, 300 MHz, 300 MHz, and 150 MHz, respectively. The timers #0 through #3 (22 through 25) are set with counter values of 500, 1000, 2000, and 3000, respectively. The power supply voltage change portion 20 supplies a power supply voltage of 1.4 V to the CPU cores #0 through #3 (10 through 13).

Let us suppose that the OS #A (14) running on the CPU core #0 (10) determines that the operating frequency for the CPU core #0 (10) needs to be changed. The OS #A (14) might determine that the operating frequency for the CPU core #0 (10) needs to be changed from 600 MHz to 300 MHz. The OS #A (14) then commands the clock generation portion #0 (16) to change the clock frequency to 300 MHz.

The OS #A (14) then acquires counter values of the timers #0 through #3 (22 through 25) from the timer counter value acquisition portion 27 and determines whether there is a timer whose counter value reaches "0." If there is a timer whose counter value reaches "0," the process terminates. In this case, the process at step S13 and later in FIG. 3 is performed. It is unnecessary to determine whether the power supply voltage needs to be changed.

If there is no timer whose counter value reaches "0," the OS #A (14) references frequency-voltage correspondence table and determines whether the power supply voltage needs to be changed. The OS #A (14) determines that the power supply voltage needs to be changed from 1.4 V to 1.2 V because the operating frequency for the CPU core #0 (10) is changed to 300 MHz. The OS #A (14) commands the power supply voltage change portion 20 to change the power supply voltage to 1.2 V.

As mentioned above, the multiprocessor according to the embodiment sets the timers #0 through #3 (22 through 25) with different counter values and determines whether the operating frequency and the power supply voltage need to be changed for the CPU core corresponding to the timer whose counter value reaches "0." This enables to exclusively control the power supply voltage as a shared resource, eliminate the need to acquire the inter-OS lock, and improve the processing efficiency.

No need to acquire the inter-OS lock can eliminate the problem of concentrated access to a memory area used for the inter-OS lock and prevent the bus performance from degrading.

Second Embodiment

The multiprocessor according to the first embodiment of the invention provides the CPU cores #0 through #3 (10 through 13) with the timers #0 through #3 (22 through 25), respectively. By contrast, the multiprocessor according to the second embodiment of the invention provides a timer for each of the OS #A (14) and the OS #B (15).

For example, the timer #1 (23) and the timer #3 (25) are removed. The timer #0 (22) is associated with OS #A (14). The timer #2 (24) is associated with OS #B (15).

When the counter value of the timer #0 (22) reaches "0," the OS #A (14) determines whether the operating frequency needs to be changed for the CPU core #0 (10) and the CPU core #1 (11). When the counter value of the timer #2 (24) reaches "0," the OS #B (15) determines whether the operating frequency needs to be changed for the CPU core #2 (12) and the CPU core #3 (13). The subsequent operations are equal to those described in the first embodiment.

As mentioned above, the multiprocessor according to the second embodiment provides the timer corresponding to the OS. This enables to further simplify the hardware configuration and the exclusive control process in addition to the effects of the first embodiment.

All the disclosed embodiments just provide examples and must be considered to be nonrestrictive. Accordingly, the scope of the present invention is defined by the appended claims rather than the foregoing description and the exemplary embodiments described therein. Various modifications may be made without departing from the spirit or scope of the general inventive concept as defined by the appended claims and their equivalents.

What is claimed is:

1. A multiprocessor that provides exclusive control over a shared resource between a plurality of operating systems running on a plurality of processor cores capable of operating at different operating frequencies, the multiprocessor comprising:
a plurality of timers that are provided to each of the processor cores and are each supplied with a period for prohibiting a change in a power supply voltage;

a first determination means for determining necessity to change an operating frequency for a processor core corresponding to any of the timers when the timer exceeds the prohibition period;

a second determination means for determining necessity to change a power supply voltage supplied to the processor cores when the first determination means determines necessity to change an operating frequency;

an operating frequency change means for changing a frequency of a clock supplied to the processor core when the first determination means determines necessity to change an operating frequency; and a power supply voltage change means for changing a power supply voltage supplied to the processor cores when the second determination means determines necessity to change a power supply voltage.

2. The multiprocessor according to claim 1, wherein the timers are set with different counter values and then start to decrement, and all the timers stop decrementing when any one of the counter values in the timers reaches 0.

3. The multiprocessor according to claim 1, wherein the power supply voltage change means supplies the processor cores with a power supply voltage corresponding to a clock having a highest operating frequency out of clocks to be supplied to the processor cores.

4. The multiprocessor according to claim 1, wherein, when the first determination means determines to increase an operating frequency of the processor core, the power supply voltage change means increases a power supply voltage and thereafter, the operating frequency change means increases an operating frequency.

5. The multiprocessor according to claim 1, wherein, when the first determination means determines to decrease an operating frequency of the processor core, the operating frequency change means decreases an operating frequency regardless of counter values of the timers.

6. A multiprocessor that provides exclusive control over a shared resource between a plurality of operating systems running on a plurality of processor cores capable of operating at different operating frequencies, the multiprocessor comprising:

a plurality of timers that are provided to each of the operating systems and are each supplied with a period for prohibiting a change in a power supply voltage;

a first determination means for determining necessity to change an operating frequency for a processor core used to run an operating system corresponding to any of the timers when the timer exceeds the prohibition period;

a second determination means for determining necessity to change a power supply voltage supplied to the processor cores when the first determination means determines necessity to change an operating frequency;

an operating frequency change means for changing a frequency of a clock supplied to the processor core when the first determination means determines necessity to change an operating frequency; and a power supply voltage change means for changing a power supply voltage supplied to the processor cores when the second determination means determines necessity to change a power supply voltage.

7. The multiprocessor according to claim 1, wherein each of the timers is set with a different counter value.

8. The multiprocessor according to claim 7, wherein, in response to a timer having a lowest count value of all the different counter values reaches a predetermined value, all of the timers stop counting.

9. The multiprocessor according to claim 6, wherein each of the timers is set with a different counter value.

10. The multiprocessor according to claim 9, wherein, in response to a timer having a lowest count value of all the different counter values reaches a predetermined value, all of the timers stop counting.

11. A multiprocessor comprising:

a first processor core configured to run a first operating system, to control a shared resource, and to receive a first timer signal;

a second processor core configured to run a second operating system, to control the shared resource, and to receive a second timer signal;

a first determiner configured to determine whether or not to change an operating frequency of the first processor core or the second processor core, in response to the first timer signal or the second timer signal exceeding a prohibition period;

an operating frequency changer configured to change a frequency of a clock supplied to the first processor core or the second processor core, in response to the first determiner determining to change the operating frequency of the first processor core or the second processor core;

a second determiner configured to determine whether or not to change a power supply voltage supplied to the first and second processor cores, in response to the first determiner determining to change the operating frequency of the first processor core or the second processor core; and a power supply voltage changer configured to change a power supply voltage supplied to the first and second processor cores, in response to the second determiner determining to change the power supply voltage.

12. The multiprocessor according to claim 11, further comprising a first timer that supplies the first timer signal, and a second timer that supplies the second timer signal.

13. The multiprocessor according to claim 12, wherein in response to i) the first timer reaching a predetermined value that causes the first and second timers to stop decrementing, and ii) the first determiner determining to not change the operating frequency of the first processing core, the operating frequency changer does not change the frequency of the clock supplied to the first processor core and a counter value of the first timer is updated.

14. The multiprocessor according to claim 11, wherein in response to the first determiner determining to change the operating frequency of the first processor core or the second processor core, and the second determiner determining to change a power supply voltage supplied to the first and second processor cores, the power supply voltage changer changes the power supply voltage before the operating frequency changer changes the frequency of the clock supplied to the first processor core or the second processor core.

* * * * *